United States Patent
Sommers et al.

(10) Patent No.: US 8,073,945 B2
(45) Date of Patent: Dec. 6, 2011

(54) METHOD AND APPARATUS FOR PROVIDING A MEASUREMENT OF PERFORMANCE FOR A NETWORK

(75) Inventors: Joel Sommers, Hamilton, NY (US); Nicholas Duffield, Summit, NJ (US); Paul Barford, Madison, WI (US); Amos Ron, Madison, WI (US)

(73) Assignees: AT&T Intellectual Property I, L.P., Atlanta, GA (US); Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 12/109,743

(22) Filed: Apr. 25, 2008

(65) Prior Publication Data
US 2009/0271508 A1      Oct. 29, 2009

(51) Int. Cl.
*G06F 13/00* (2006.01)
(52) U.S. Cl. .................. 709/224; 709/220; 709/238

(58) Field of Classification Search .................. 709/204, 709/206, 217, 219, 220, 223, 224, 238
See application file for complete search history.

(56) References Cited

U.S. PATENT DOCUMENTS

| | | | | |
|---|---|---|---|---|
| 7,133,368 | B2 * | 11/2006 | Zhang et al. | 370/249 |
| 7,573,829 | B2 * | 8/2009 | Blair et al. | 370/250 |
| 7,606,887 | B1 * | 10/2009 | Stewart et al. | 709/223 |
| 7,613,142 | B2 * | 11/2009 | Molteni et al. | 370/328 |
| 7,675,861 | B2 * | 3/2010 | Metzger et al. | 370/241 |
| 7,848,337 | B1 * | 12/2010 | Weng et al. | 370/401 |
| 2007/0140135 | A1 * | 6/2007 | Sheppard | 370/250 |
| 2007/0177518 | A1 * | 8/2007 | Li et al. | 370/252 |

* cited by examiner

*Primary Examiner* — Viet Vu
(74) *Attorney, Agent, or Firm* — Greenblum & Bernstein, P.L.C.

(57) ABSTRACT

A method and an apparatus for providing a measurement of performance for a network are disclosed. For example, the method sends a plurality of multi-objective probes on a path, and receives one or more of said plurality of multi-objective probes for the path. The method then determines a plurality of performance measurements.

20 Claims, 5 Drawing Sheets

METHOD AND APPARATUS FOR PROVIDING A MEASUREMENT OF PERFORMANCE FOR A NETWORK

The present invention relates generally to communications networks and, more particularly, to a method and apparatus for providing a measurement of performance for a packet network, e.g., a Local Area Network (LAN), a Virtual Private Network (VPN), an Internet Protocol (IP) network, and the like.

BACKGROUND OF THE INVENTION

A customer may request a network service provider to guarantee the performance of one or more network services. For example, the service provider and the customer may detail the level of network performance for a service to be received by the customer in a Service Level Agreement (SLA). For example, a SLA may detail transport level service assurances for a service using performance parameters such as: frequency of loss events, duration of loss events, packet loss rates, delay, delay variation, etc. Failing to meet an SLA guarantee may result in a service disruption for the customer. In addition, the failure to meet an SLA guarantee may result in a loss of revenue for the customer and/or the network service provider.

The service provider may perform compliance monitoring to ensure that SLA targets are met. The compliance monitoring may be performed passively by collecting network data or actively by injecting measurement probes. Passive measurements are performed on a link-by-link basis and are not well suited to end-to-end performance targets. Current active measurements are focused on assessing a specific parameter (e.g., delay or loss), and are often not sufficiently accurate to determine whether an SLA has been violated.

SUMMARY OF THE INVENTION

In one embodiment, the present invention discloses a method and apparatus for providing a measurement of performance for a network. For example, the method sends a plurality of multi-objective probes on a path, and receives one or more of said plurality of multi-objective probes for the path. The method then determines a plurality of performance measurements.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention a method and apparatus for providing a measurement of performance for a packet network, e.g., a Local Area Network (LAN), a Virtual Private Network (VPN), an Internet Protocol (IP) network, and the like. For example, the present invention discloses a method for providing SLA compliance monitoring.

Figure 1:
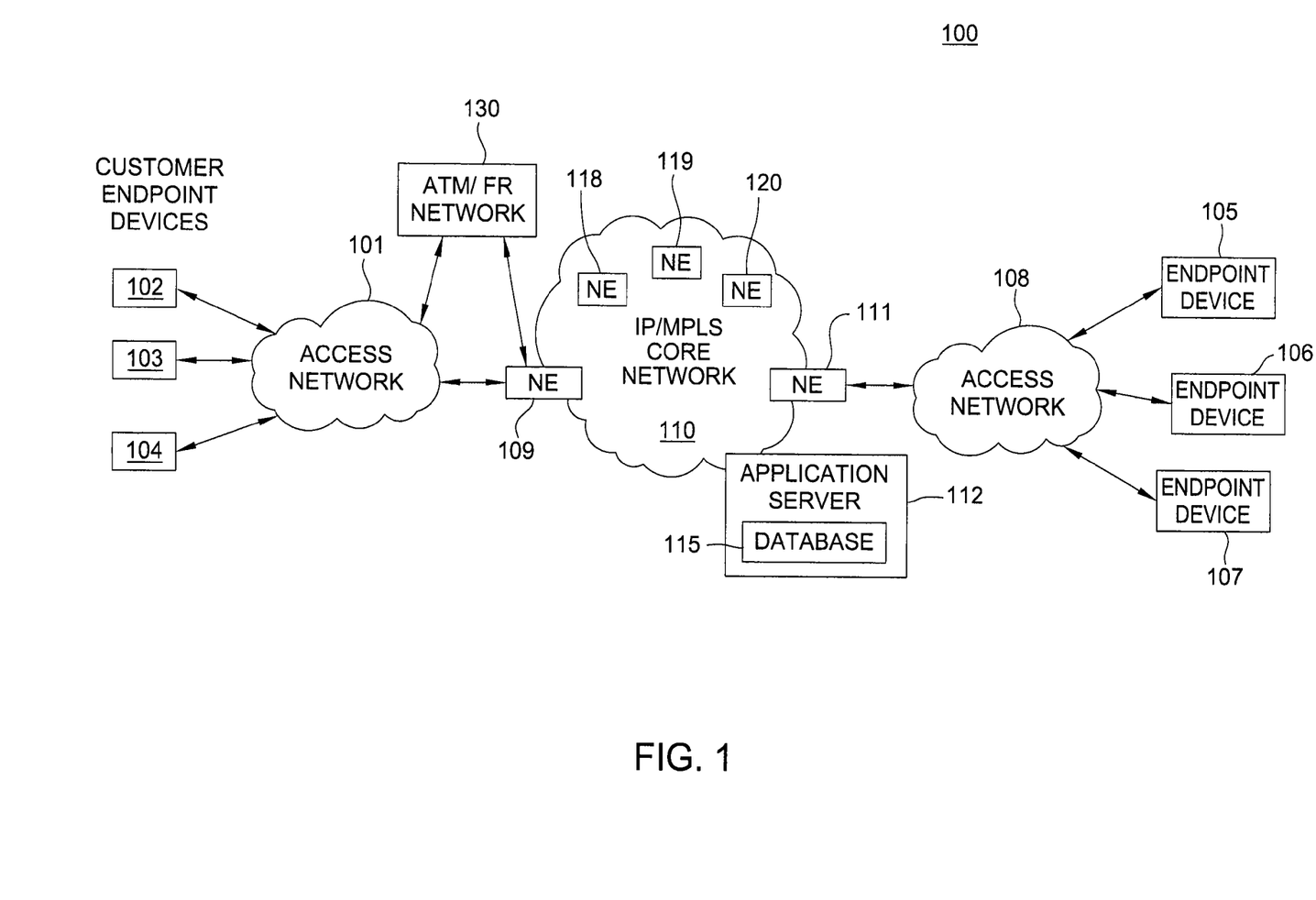
FIG. 1 illustrates an illustrative network related to the current invention.

FIG. 1 illustrates an exemplary packet network 100 related to the current invention. Exemplary packet networks include Internet protocol (IP) networks, Asynchronous Transfer Mode (ATM) networks, frame-relay networks, and the like. An IP network is broadly defined as a network that uses Internet Protocol such as IPv4 or IPv6 and the like to exchange data packets. It should be noted that the present invention is not limited to a particular type of network.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 may contain Layer 2 switches functioning as Provider Edge Routers (PERs) and/or Provider Routers (PRs). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 may also comprise an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, one application server are depicted in FIG. 1, the communication network 100 may be expanded by including any number of additional endpoint devices, access networks, network elements, application servers without altering the scope of the present invention.

The above IP network is described to provide an illustrative environment in which packets for voice and data services are transmitted on networks. In one embodiment, the network service provider and the customer may detail the network performance level for a network used to transport packets for the customer in a Service Level Agreement (SLA). For example, the SLA may detail transport level service assurances using network performance parameters. For example, the SLA may provide minimum performance targets for frequency of loss events, duration of loss events, packet loss rates, delay, delay variation, etc.

The network service provider may then perform compliance monitoring to determine if the performance parameters are meeting the minimum performance targets. The compliance monitoring may be based on passive or active measurements. For example, a passive measurement may be performed by collecting data from one or more counters (e.g., Simple Network Management Protocol (SNMP) counters) located within the network. However, the packets from and/or to the customer may traverse multiple links and/or networks. Hence, the passive measurement is insufficient for estimating the performance level experienced by the customer traffic on an end-to-end basis.

It should be noted that although the present invention is disclosed in the context of a single service provider, the present invention is not so limited. Namely, the present invention can be adapted to the end-to-end monitoring through multiple networks owned by different service providers.

An active measurement may be performed by injecting one or more measurement probes. A measurement probe refers to one or more packets sent on an end-to-end path. However, current active measurement probes are limited in focus to estimation and optimization of a single performance parameter. For example, one or more packets may be injected to measure the end-to-end delay for a customer traffic traversing a network. Furthermore, current active measurements make assumptions about underlying network conditions and are not suitable for realistic networks with abrupt changes.

In one embodiment, the present invention broadly discloses a method and apparatus for providing a measurement of performance for a network using a multi-objective probe. To better understand the present invention, the following networking terminology will first be provided:
  Probe;
  Multi-objective probing;
  Packet loss rate;
  Delay; and
  Delay Variation.

A probe refers to one or more packets sent on an end-to-end path. For example, a delay measurement probe may be sent from a source to a destination to determine the delay being experienced by packets in traversing the network from the source to the destination. It should be noted that various systems can be used to send or receive probes, e.g., general purpose computers or NEs (e.g., switches, routers, and the like).

Multi-objective probing refers to simultaneous estimation of multiple performance metrics using a single probing stream of packets.

Packet loss rate refers to the total number of lost packets divided by the total number of transmitted packets on a given path (consisting of one or more links) over a specified time interval. For example, if one packet is lost out of 1000 packets sent in one second, the packet loss rate is 0.001 per second.

Delay refers to the duration of time between when a packet is sent by an origination device and when the packet is received by a destination device. For example, a delay may be the time a packet takes to travel from the origination device to the destination device.

Delay Variation refers to a measurement of the variation of delay experienced by multiple packets. For example, if two packets are sent one second apart and they reach the destination at one second apart, then the delay variation is zero. However, if the packets are received 1.1 seconds apart (in the order sent), then there is a delay variation in the network. Delay variation is sometimes refers to as a jitter.

Note that an SLA may specify availability as a performance parameter. Availability can be loosely defined as the capability of the network to successfully transmit any end-to-end probe over an interval of time. Thus, availability may be considered as a special case of a loss rate. The current invention addresses availability as a special case of a loss rate and as such, it is not discussed separately.

Figure 2:
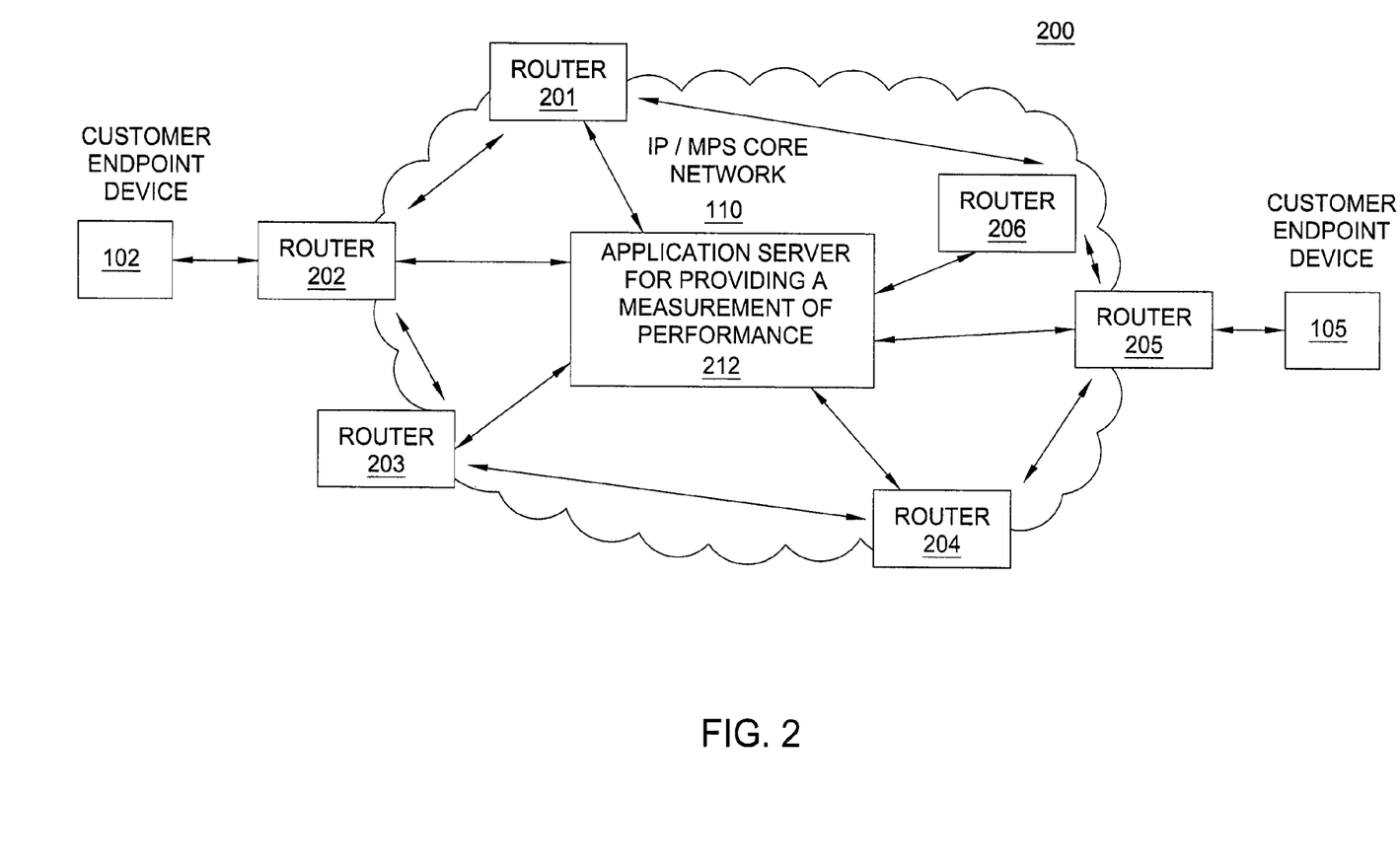
FIG. 2 illustrates an illustrative network of the current invention for providing a measurement of performance for a network.

FIG. 2 illustrates an illustrative network 200 of the current invention for providing a measurement of performance for a network. For example, the customer endpoint devices 102 and 105 are communicating via the IP/MPLS core network 110. The IP/MPLS core network 110 may contain various routers 201-206 that support the communications between customer endpoint devices 102 and 105. FIG. 2 broadly shows that packets associated with the communications between customer endpoint devices 102 and 105 may traverse over different paths or links within the network 110.

In one embodiment, the network service provider implements the current invention for providing a measurement of performance parameters in an application server 212. The application server 212 implements one or more performance measurement algorithms for various network performance parameters, e.g., delay, delay variation, packet loss rate, and the like.

Figure 3:
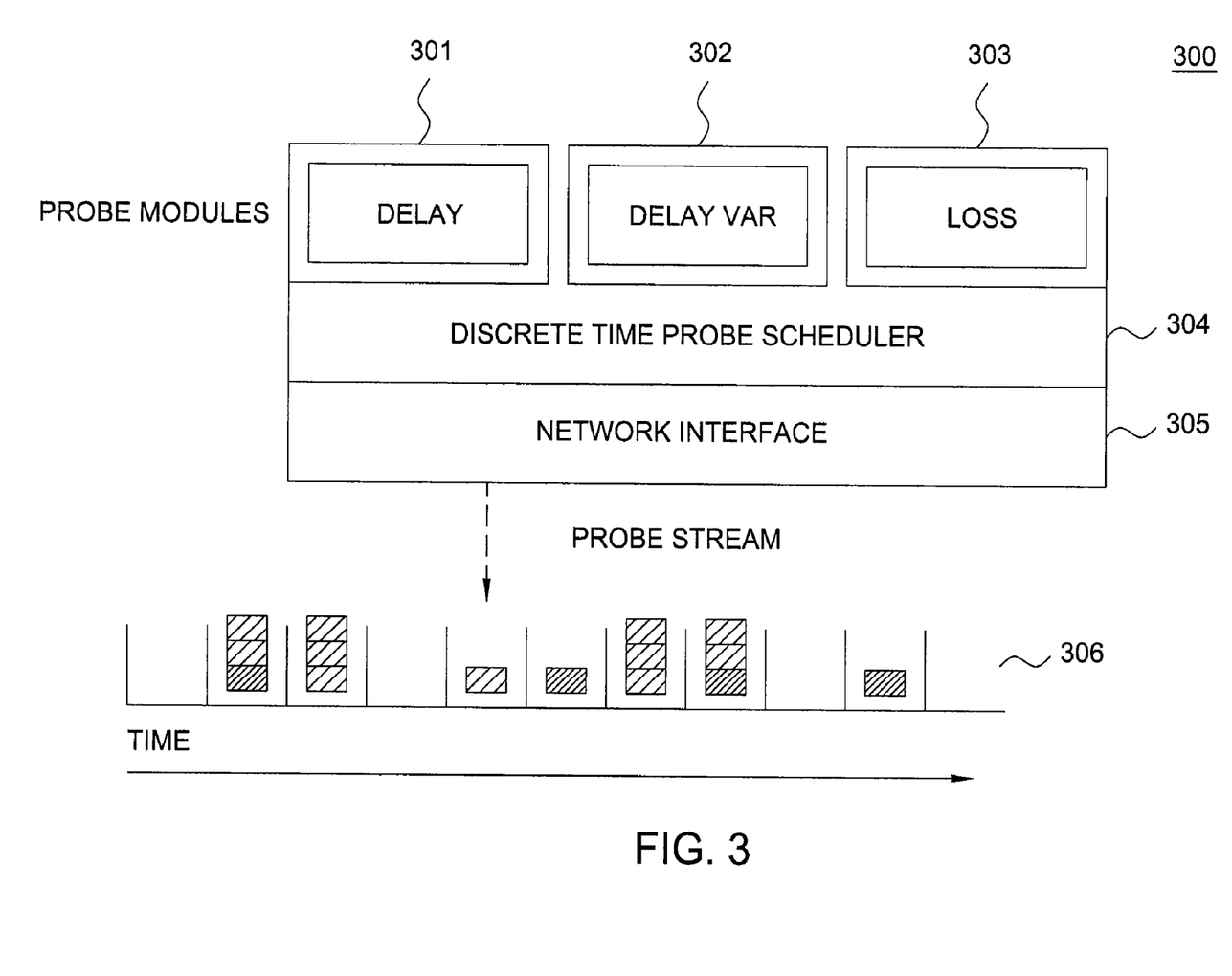
FIG. 3 illustrates an illustrative architecture of a multi-objective probe scheduler.

FIG. 3 illustrates an illustrative architecture 300 of a multi-objective probe scheduler. In one embodiment, one or more discrete-time performance measurement algorithms operating at the same time may schedule measurement probes to be sent at the same time slot. The requests may be accommodated by tagging probes according to one or more relevant estimator. Thus, a single probe stream 306 may be used for concurrent estimation of performance parameters such as delay, delay variation, packet loss, and other quantities, thereby reducing the impact of measurement traffic on a network.

In one embodiment, the discrete-time scheduler 304 provides callback and probe scheduling mechanisms. Probe modules 301, 302 and 303 provide various path-oriented performance measurement methods for delay, delay variation and packet loss, respectively. These path-oriented performance measurement methods will be described further below. The probe scheduler 304 interacts with network elements for sending and receiving probes via the network interface 305, i.e., generating a single probe stream 306 for measuring delay, delay variation and packet loss. This architecture allows for logical separation among multiple, simultaneously operating performance measurement methods and for optimizations of network bandwidth.

In one embodiment, a multi-objective probe may include one or more of: a time stamp indicating when the probe was sent, a time stamp indicating when the probe is received, one or more markers to indicate the parameter to be measured, size of the probe (e.g., the number of packets in each probe), the time spacing of the packets within a probe, and/or the sequence number within a probe.

In one embodiment, the current invention provides a measurement of delay for a network. For example, the measurement of delay may be performed to determine various statistical values for delay parameters such as mean delay, median delay, or high quantiles of the delay distribution such as $95^{th}$ percentile, $99^{th}$ percentile, and so on.

In one embodiment, the current method provides an estimate of mean delay along a path. For example, the method first models the delay as a continuous function $f(t)$ whose independent variable is the time that a probe packet is sent and the dependent variable is measured as a one-way delay. Based on this model, a method to provide the mean delay estimation is to use Simpson's method for numerical integration. The Simpson's formulation is straightforward: once the domain of integration is partitioned, the integral of the function $f$ over the subinterval $I_j$ is estimated by $$\frac{1}{6}(f(a_j) + f(b_j) + 4f(c_j)),$$

with $a_j$, $b_j$ the endpoints of $I_j$, and with $c_j$ its midpoint. The error of the Simpson estimate is known to be $$e_j = \frac{f^{(4)}(\xi_j)}{2880}|I_j|^5,$$

with $\xi_j$ some point in the interval $I_j$. Thus, if the fourth derivative of $f$ exists and is not too large, it is safe to state that the local error is of order 5; i.e., if the number of samples are doubled, the error in the estimate is reduced locally by a factor of 32, and globally by a factor of 16.

To apply Simpson's method to a discrete-time probe process for estimating mean end-to-end delay, the method does the following: at time slot i, the method draws a value k from a geometric distribution with parameter $p_{delay}$. The geometric distribution is the discrete analog of the exponential distribution and yields unbiased samples. Probes representing the endpoints $a_j$ and $b_j$ are sent at time slots i and i+2(k+1) with the midpoint probe sent a time slot i+(k+1). At time slot i+2(k+1) the next subinterval begins, thus the last probe of a given subinterval is the first probe of the next one. Simpson's estimates from each subinterval are summed to form the total area under the delay function. The mean delay estimate is then obtained by dividing the integral estimate by the number of subintervals.

With the above formulation, the subintervals are not of equal lengths. In fact, the lengths form a geometric distribution. Thus, the method may either directly apply Simpson's method to estimate the mean delay, or the method may apply relative weights to the subintervals according to their lengths. In one embodiment, the current invention uses weighted subintervals to get more accurate results.

The above method to estimate mean delay described probes that are received at the destination device. However, probes may be lost in transit. In one embodiment, the current method discards subintervals where a probe loss occurs.

The above method assumed that delay largely behaves as a smooth function. However, for some network conditions it may be more accurate to account for random spikes in delay by modeling the process as the sum of two processes, one smooth and one random. For example, if the function $f(t)$ is written as $f_1(t)+f_2(t)$, with $f_1(t)$ smooth and $f_2(t)$ random, then the numerical integration does much better on $f_1(t)$ and slightly worse on $f_2(t)$ as compared to straight averaging. The Simpson's approach is effective for this model as well: if the values of the random part are quite small compared to the smooth part, then the estimate is better than simple averaging.

Note that there is little risk in using Simpson's method. Even if delay is a completely random process (which is highly unlikely), the variance of the Simpson's rule estimator for mean delay is increased only slightly as compared to simple averaging.

In one embodiment, the current method provides an estimate of one or more high quantiles for a delay along a path, such as the 95th percentile. Mathematically defined, let $\{x_i: i=1, \ldots, n\}$ be n independent samples drawn at random from a common distribution F, sorted in increasing order. For simplicity, assume F is continuous. Let $Q_p$ denote the $p^{th}$ quantile of that distribution, i.e., the unique solution of $F(Q_p)=p$).

The method obtains confidence intervals for $Q_p$ based on $\{x_i\}$. One approach is to start with the empirical distribution function:
$\hat{F}(x)=n^{-1}\#\{i:x_i \leq x\}$ and use a quantile estimate of the form: $\hat{Q}_p=\max\{x:\hat{F}(x) \leq p\}$. Analysis of the variance of this estimator might then give asymptotic confidence intervals as n becomes large. Instead, the method seeks probabilistic bounds on $Q_p$ that hold for all n.

Now $\{x_k \leq x\}$ is the event that at least k of the samples are less than or equal to x, an event which has probability $G(n,F(x),k)$, where $$G(n, p, k) = \sum_{j \geq k} p^j (1-p)^{n-j} \binom{n}{j}.$$

Taking $x = Q_p,$ $Pr[x_k \leq Q_p] = G(n, p, k).$

Based on the $x_i$, the method now determines a level $X^+(n, p, \epsilon)$ that the true quantile $Q_p$ is guaranteed to exceed only with some small probability $\epsilon$. Thus, the method chooses $X^+(n,p,\epsilon) = x_{K^+(n,p,\epsilon)}$ with $K^+(n,p,\epsilon) = \min\{k: G(n,p,k) \leq \epsilon\}$.

Similarly, $Pr[x_k \geq Q_p] = 1 - G(n,p,k)$. Based on the $x_i$, the method determines a level $X^-(n,p,\epsilon)$ that the true quantile $Q_p$ is guaranteed to fall below only with some small probability $\epsilon$. Thus, the method chooses $X^-(n,p,\epsilon) = x_{K^-(n,p,\epsilon)}$ with $K^-(n,p,\epsilon) = \max\{k: 1 - G(n,p,k) \leq \epsilon\}$.

In other words, $K^+(n,p,\epsilon)$ is the $1-\epsilon$ quantile of the binomial $B_{n,p}$ distribution, while $K^-(n,p,\epsilon)$ is the $\epsilon$ quantile of the binomial $B_{n,p}$ distribution. The $K^\pm$ can be computed exactly.

Table 1 provides some example quantile indices $K^\pm$ for various sample sizes n, and quantiles p. Confidence level is $1-\epsilon=90\%$. Also shown is the reference quantile index $K^0=np$. The dash (shown as -) indicates that no upper bound $K^+$ was available, which may occur when the top atom has mass greater than the desired significance level, i.e., $p^n > \epsilon$.

TABLE 1

| | Quantile | | | | | | | | |
|---|---|---|---|---|---|---|---|---|---|
| | p = 50 | | | p = 90 | | | p = 99 | | |
| n | $K^-$ | $K^0$ | $K^+$ | $K^-$ | $K^0$ | $K^+$ | $K^-$ | $K^0$ | $K^+$ |
| 100 | 44 | 50 | 57 | 86 | 90 | 95 | 98 | 99 | — |
| 1000 | 480 | 500 | 521 | 888 | 900 | 913 | 986 | 990 | 995 |
| 10000 | 4936 | 5000 | 5065 | 8961 | 9000 | 9039 | 9887 | 9900 | 9914 |

In one embodiment, the current invention provides a measurement of delay variation. The method first considers a stream of probes of length k, e.g., 100 probes. The method denotes the time difference between two probes i and j when they are sent as $S_{i,j}$, and the time difference between the same two probes when they are received as $r_{i,j}$. The method then constructs a matrix M where each cell $M_{i,j}$ contains the ratio $r_{i,j}/s_{i,j}$. Thus, $M_{i,j}$ is 1 if the spacing between probes i and j does not change; is greater than 1 if the measured spacing increases; or is less than 1 if the measured spacing decreases as the probes traverse the network path. Ratio $r_{i,j}/s_{i,j}$ is defined as 1 for i=j and it is defined as 0 if probe i or j is lost. Note that computing the above ratio $r_{i,j}/s_{i,j}$ with respect to consecutive probes in the stream gives a more accurate description of the instantaneous nature of delay variation while probes farther apart give a description of delay variation over longer time intervals.

The method then computes the eigenvalues of the matrix M, resulting in a vector e of length k, with values sorted from largest to smallest. If the probe stream traverses the network undisturbed, the matrix M would consist entirely of ones, with the largest eigenvalue as k and all other eigenvalues as 0. The method denotes the vector of these "expected" eigenvalues as e'. The method then subtracts e' from e, taking the $L_1$ norm of the resulting vector:

$$\sum_{i=1}^{k} |e_i - e'_i|.$$

The method refers to this $L_1$ norm as the delay variation matrix parameter. The delay variation matrix is useful for relative comparisons over time. The delay variation matrix formulation relies on and is motivated by the fact that there is a notion of what is expected in the absence of turbulence along the path, i.e., that probe spacing should remain undisturbed. By looking at the eigen-structure of the delay variation matrix, the method may extract the amount of distortion from what the method expects.

In one embodiment, the current invention provides a measurement of packet loss rate. As defined above, a packet loss rate is derived from the number of lost packets and the number of sent packets for a given time. The difficulty in determining a packet loss rate is estimating the number of sent packets (i.e. the demand for a path). The current invention uses a heuristic approach which initiates a probe pair at a given time slot with probability $p_{loss}$ for estimation of the end-to-end frequency of congestion episodes $\hat{F}$ and the mean duration of congestion episodes $\hat{D}$.

Frequency of congestion episodes refers to the number of loss events over a period of time. The frequency may also be referred to as the frequency of loss event. Duration of congestion episodes refers to the period of time a loss event persists. The duration of congestion episode may also be referred to as the duration of loss event. For example, a network may experience a packet loss event with frequency of one time per 24 hour period with a mean duration of the loss event being 15 seconds. Various methods of measuring loss event frequency and duration are well known. For example, one method of measuring loss event frequency and duration is disclosed in Sommers et al., "Improving Accuracy In End-To-End Packet Loss Measurement", Proceedings of ACM SIGCOMM '05, 2005, which is herein incorporated by reference.

In this heuristic approach, each probe consists of three packets, sent back-to-back. The method measures the loss rate $\hat{l}$ of the probes during congestion episodes. Since the methodology does not identify individual congestion episodes, the method then takes an empirical approach, treating consecutive probes in which at least one packet is lost as an indication of a congestion episode. The method assumes that the end-to-end loss rate L is stationary and ergodic. Given an estimate of the frequency of congestion $\hat{F}$, the method estimates the end-to-end loss rate as $\hat{L}=\hat{F}\hat{l}$. The key assumption of this heuristic is that the method treats the probe stream as a marker flow, viz., that the loss rate observed by this flow has a meaningful relationship to other flows along the path.

Note that the probes comprise of multiple packets (e.g., a default of 3 packets per probe). In one embodiment, the probe stream can be a Transmission Control Protocol (TCP) stream. However, the present invention is not limited to a particular type of probe stream.

A set of methodologies for efficient per-path monitoring have been described above. In one embodiment, SLA compliance monitoring requires accurate and efficient measurement on a network-wide basis. For example, a service provider may wish to deploy a network wide SLA compliance monitoring. However, the measurement overhead of sending probes over a full $n^2$ mesh of paths is quite expensive.

In one embodiment, the current method provides an economical monitoring over a subset of network paths by inferring lower bounds on the quantiles of a distribution of path performance measures using measurements from a subset of network paths. In order to describe the methodology for network wide SLA monitoring more clearly, the mathematical foundation is first provided below.

Let G=(V,E) be a directed graph comprising vertices (nodes) V and directed edges (links) $(v_1,v_2) \in E \subset V \times V$. Let R be a set of paths (routes) i.e., each $r \in R$ is an ordered set of n>0 contiguous links $(v_0,v_1), (v_1,v_2), \ldots, (v_{n-1},v_n)$. The routing matrix A associated with R is the incidence matrix of the links in the routes, namely, $A_{re}=1$ if link e occurs in route r and zero otherwise.

The method now describes what is referred to as a scalar additive network performance model. Let $x:E \to \mathbb{R}$ be a function on the links. This gives rise to the path function $y:R \to \mathbb{R}$ defined as $y_r = \sum_{e \in r} x_e = \sum_{e \in E} A_{re} x_e$. This relation is a prototype for additive network performance models. Two examples are additive network performance model for a network delay and additive network performance model for a network loss.

Additive network performance model for a network delay refers to a performance model wherein the latency of a packet traversing the path r is the sum of the latencies incurred on each link of the path. This may be understood either as the $x_e$ being individual measurements, or as $x_e$ being mean latencies.

Additive network performance model for a network loss refers to a performance model, wherein $x_e$ is the log transmission probability of traversing link e. If there is no spatial correlation between link losses, the method can determine $y_r$ as the log transmission probability along the path r.

For scalar additive performance measures, suppose that the matrix A is not of full (row) rank. Then, the set of row vectors is not linearly independent. Consequently, there exists a minimal set of paths $S \subset R \wedge S \neq R$ which span, such that every row of $a_r = \{A_{re} : e \in E\}$ of A can be expressed as a linear combination of the $\{a_r : r \in S\}$. For the scalar additive performance model, this translates to saying that all $\{y_r : r \in R\}$ can be determined from the subset $\{y_r : r \in S\}$.

The current method extends the computational approach described above to infer distributions of a set of path performance measures from a subset. The method assumes in a given network setting the existence of the set of paths $S \subset R \wedge S \neq R$ with the properties detailed above established. This means in particular that for every network path in R, every link in this path is traversed by some path in the subset R. The distributions of delay in R can be inferred from only those in S. This inference depends on the assumption that any packet traversing a given link will experience the same delay distribution, even if the actual delays differ.

There are two challenges in trying to extend the scalar approach to distributions. The first is dependence among link measurements. Dependence is not an issue in the linear algebra of mean quantities since the average of a linear combination of random variables is equal to same linear combination of respective averages even when the variables are dependent. Working with distributions is more complex, for example the distribution of a sum of random variables is not equal to the convolution of their distributions unless the random variables are independent. A second complexity is algebraic: there is no simple subtraction operation for distributions. For example, if X and Y are independent random variables and X=Y in distribution, it is not the case that X−Y is identically zero.

Now, assume the routing (and hence the matrix A) is static over a measurement interval. On each path r a stream of measurement packets labeled i=1,2, . . . ,$n_r$ is launched along the path. Packet i incurs a latency $X_{re}^i$ on traversing the link e ∈ r. The latency of the packet on the path is $Y_r^i = \Sigma_{e \in r} X_{re}^i$.

The statistical assumption is that all $X_{re}^i$ are independent. The assumption reflects either a delay encountered by a single multicast packet or a train of closely spaced unicast packets prior to branching to distinct endpoints.

In the present case, the method can consider two types of dependence. In the first case, the method considers dependence between different measurements. Provided probe packets are dispatched at intervals longer than the duration of a network congestion event, then probes on the same path or on intersecting paths are unlikely to exhibit delay dependence, even if individual packets experience the distribution of congestion events similarly on the same link. Thus, it seems reasonable to model the $Y_{re}^i$ as independent. The second case to consider is dependence among the individual link delays $X_{re}^i$ on a given path r. Violation of this property might occur in packet streams traversing a set of links congested by the same background traffic. The link delay correlation should not be significant in a large network with a diverse traffic.

For r ∈ R let $\{b_{rr'} : r' \in S\}$ be the coefficients of the spanning set $\{a_{r'} \in S\}$ in the expression of $a_r$, i.e., $$a_r = \sum_{r' \in S} b_{rr'} a_{r'}. \quad (1)$$

Let $S_r^+ = \{r' \in S : b_{rr'} > 0\}$ and $S_r^- = \{r' \in S : b_{rr'} < 0\}$. Assume $\{a_r : r' \in S \ R\}$ is a minimal spanning set. For each r ∈ R there exist positive integers $d_r$ and $\{d_{rr'} : r' \in S\}$ such that $$d_r a_r + \sum_{r' \in S_r^-} d_{rr'} a_{r'} = \sum_{r' \in S_r^+} d_{rr'} a_{r'}. \quad (2)$$

For each r ∈ R, e ∈ E let $X_{re}^{(i)}$, i=1,2, . . . denote the sum of i independent copies of a single delay on link e, e.g., $X_{re}^1$; likewise let $Y_r^{(i)}$ denote the sum of i independent copies of $Y_r^i$.

The symbol $=^d$ will denote equality in distribution. Then, $$Y_r^{(d_r)} + \sum_{r' \in S_r^-} Y_{r'}^{(d_{rr'})} =^d \sum_{r' \in S_r^+} Y_{r'}^{(d_{rr'})}. \quad (3)$$

One can see in equation (3) a basic feature of the results that follows merely from the partition of S into $S_r^-$ and $S_r^+$. Suppose one is primarily interested in determining whether $Y_r$ often takes some large value. Suppose measurements indicate that some of the $\{Y_{r'} : r' \in S_r^+\}$ tend to take large values, but that none of the $\{Y_{r'} : r' \in S_r^-\}$ do. Then, from the equality (3), $Y_r$ must also tend to take large values. If none of the $\{Y_{r'} : r' \in S\}$ tend to take large values, then neither does $Y_r$. But when some $Y_{r'}$ for r' in both $S_r^+$ and $S_r^-$ tend to take large values, then it is difficult to draw conclusions about $Y_r$.

Then, let $\gamma_r$ denote the common distribution of the $Y_r^i$, and $\tilde{\gamma}_r$ its Laplace transform, i.e., $\tilde{\gamma}_r(s) = \int_0^\infty \gamma_r(dy) e^{-sy}$. Let * denote convolution. In terms of distributions, equation (3) becomes $$y_r^{*d_r} * \underset{r' \in S_r^-}{*} y_{r'}^{*d_{rr'}} = \underset{r' \in S_r^+}{*} y_{r'}^{*d_{rr'}}. \quad (4)$$

In Laplace transform space, from equation (4):

$$\tilde{y}_r^{d_r} \prod_{r' \in S_r^-} \tilde{y}_{r'}^{d_{rr'}} = \prod_{r' \in S_r^+} \tilde{y}_{r'}^{d_{rr'}}. \quad (5)$$

Given empirical estimates of $\{\gamma_{r'} : r' \in S\}$ one can use numerical Laplace transform inversion to recover all $\gamma_r$. The current method uses equation (4) directly in order to obtain bounds on the distributions $\gamma_r$.

Let $V_i$, i=1,2, . . . ,n be independent random variables and let $$V = \sum_{i=1}^n V_i$$

be their sum. Let $Q_p(V_i)$ denote the p-quantile of $V_i$, i.e., $$Pr[V \leq x] \geq p \Leftrightarrow Q_p(V) \leq x. \quad (6)$$

The following result formalizes the statement that if one knows that $V_1 \leq x$ a fraction p of the time, and $V_2 \leq y$ a fraction q of the time, then one can conclude that $v_1 + v_2$ is less than x+y no less than a fraction pq of the time.

Let $V_i$, i=1,2, . . . ,n be independent random variables with sum $V = \Sigma_{i=1}^n V_i$, and let $p_i \in (0,1]$ with $p = \Pi_{i=1}^n p_i$, then $$Q_p(V) \leq \sum_{i=1}^n Q_{p_i}(V_i). \quad (7)$$

For network quantile bounds, denote $Y_r^{\pm} = \Sigma_{r' \in S_r^{\pm}} Y_{r'}^{(d_{rr'})}$, then (i) $Q_p(Y_r) \geq (d_r)^{-1} Q_{p^{d_r}}(Y_r^{(d_r)})$;

(ii) $Q_p(Y_r^{(d_r)}) \geq Q_{pq}(Y_r^+) - Q_q(Y_r^-)$; and (iii) $Q_p(Y_r) \geq (d_r)^{-1} \sup_{q \in (0,1]} (Q_{p^{d_r} q}(Y_r^+) - Q_q(Y_r^-))$. (8)

The above inequalities for network quantiles provide a lower bound on the quantiles, or, equivalently, an upper bound on the cumulative distribution. Thus, the inequalities underestimate the frequency with which a given level is exceeded. This may or may not be desirable if the measured quantiles are to be used for detecting service level agreement violations (i.e., raising alarms). On the one hand false positives will be reduced, while at the same time some high quantiles may be underestimated. A knowledge of the topology of measured paths may be used to adjust alarm thresholds in order to mitigate the effects of quantile underestimation.

The method first discretizes the distributions before performing convolution. A positive discrete mass distribution is specified by a tuple $(\epsilon,n,m=\{m_i:i=0,\ldots,n\})$ where $\epsilon$ is the bin width, with a mass $m_i$ in bin $[i\epsilon,(i+1)\epsilon)$ for $i=0,1,\ldots,n-1$, and mass $m_n$ in $[n\epsilon,\infty)$. The two such distributions $(\epsilon,n,m)$ and $(\epsilon',n',m')$ have convolution:

$$(e,n,m)*(e',n',m')=(\epsilon+\epsilon',1+(n-1)(n'-1),m'') \quad (9)$$

where $$m_j'' = \sum_{i=0}^{j} m_i m_{j-i}'.$$

Given $\epsilon,n$, a set of measurements $\{Y_r^i:i=1,2,\ldots,n_r\}$ give rise to an empirical discrete mass distribution $(\epsilon,n,m)$ with $m_i=\#\{Y_r^i:Y_r^i\in[i\epsilon,(i+1)\epsilon)\}$ for $i=0,1,\ldots,n-1$ and $m_n=\#\{Y_r^i:Y_r^i\geq n\epsilon\}$. The distribution of each $$\left\{\sum_{r'\in S_r^\pm}\sum_{i=1}^{d_{rr'}} y_{rr'}: y_{rr'}\in\Omega_r\right\}$$

is then estimated by taking the grand convolution over $r'\in S_r^\pm$ of the $d_{rr'}$-fold convolutions of the empirical mass distribution generated from each $\#\{Y_r^i:Y_r^i\in[i\epsilon,(i+1)\epsilon)\}$. A target resolution $\epsilon$ in the final distribution is achieved by choosing resolutions $\epsilon'$ for the constituent distribution that sum to $\epsilon$, for example, $\epsilon'=\epsilon/\Sigma_{r'\in S_r^\pm}d_{rr'}$. Finally, the method normalizes to a probability distribution by dividing each mass element by $n_r^\pm$. The resulting variables are $\hat{Y}_r^\pm$, and the method uses them in place of the $Y_r^\pm$ in the inequalities (8) above.

Figure 4:
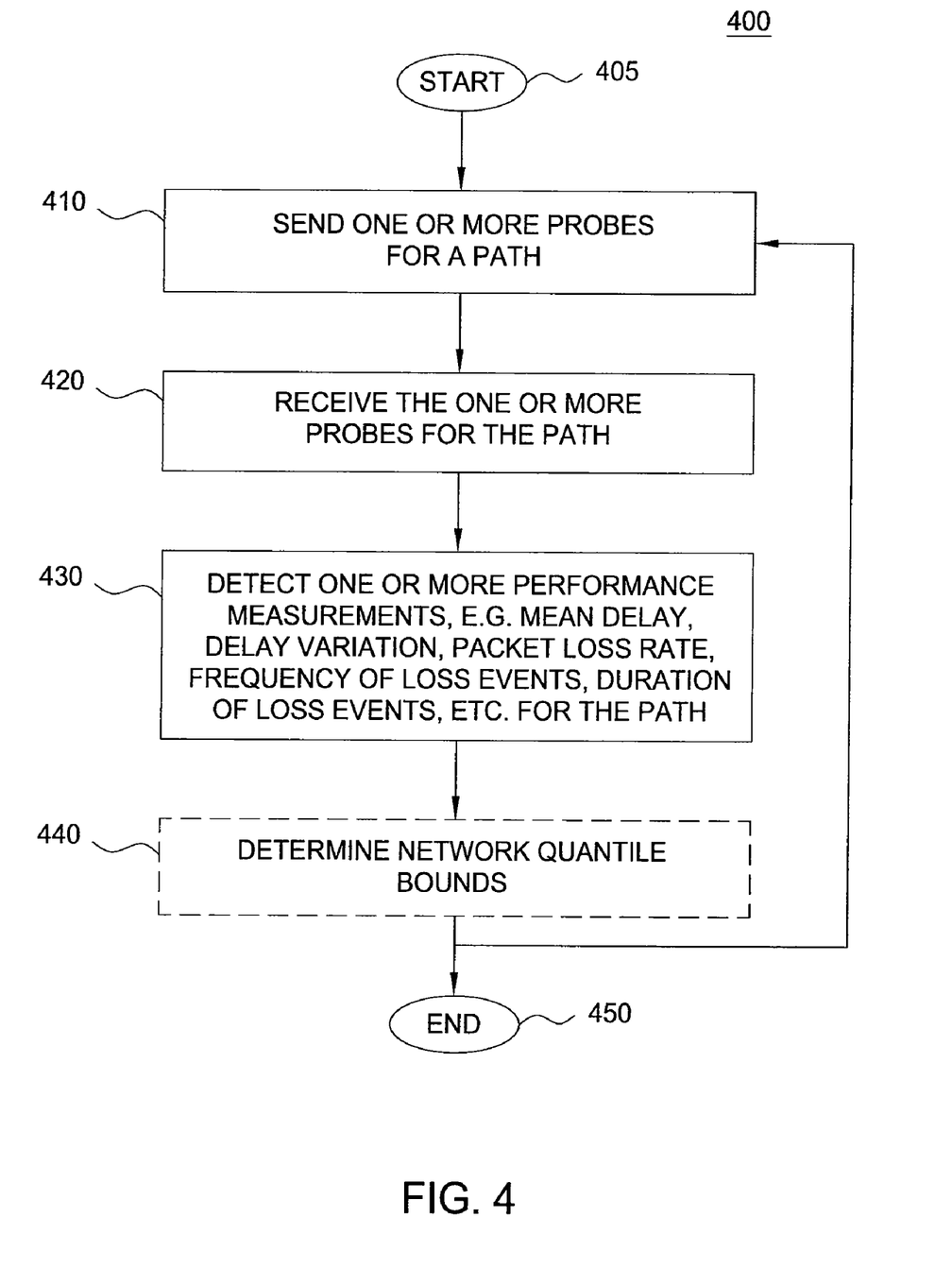
FIG. 4 illustrates a flowchart of a method for providing a measurement of performance for a network.

FIG. 4 illustrates a flowchart of a method 400 for providing a measurement of performance for a network. For example method 400 can be implemented by application server 212. Method 400 starts in step 405 and proceeds to step 410.

In step 410, method 400 sends one or more probes for a path. For example, the method sends a multi-objective probe for measuring one or more performance parameters on an end-to-end path.

In step 420, method 400 receives the one or more probes for the path. For example, the method receives packets that were part of the above multi-objective probe. Note that some of the packets may be lost.

In step 430, method 400 detects or determines one or more performance measurements. For example, the method detects or determines one or more of mean delay, delay variation, packet loss rate, frequency of loss events, duration of loss events, etc. for the path. For example, one or more performance measurement methods as disclosed above can be used.

In optional step 440, method 400 determines network quantile bounds. For example, the method may determine bounds on network delay and/or network loss for network wide compliance monitoring. The method then proceeds back to step 410 to send additional probes or ends in step 450.

It should be noted that the steps that define method 400 can be conducted within the context of a larger set of measurement objectives that are constrained by the amount of probe traffic that is introduced into the network over a given period of time. This budget can be defined by the accuracy of the resulting measurements where, roughly speaking, the larger the probe budget, the higher the resulting accuracy. The budget can also be defined by the probes consumption of network bandwidth where, roughly speaking, the lower the probe bandwidth consumption, the lower the resulting accuracy. The probe budget specification can also take both impact and accuracy into consideration.

It should be noted that although not specifically specified, one or more steps of method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation, or involve a decision, do not necessarily require that both branches of the determining operation be practiced. In other words, one of the branches of the determining operation can be deemed as an optional step.

Figure 5:
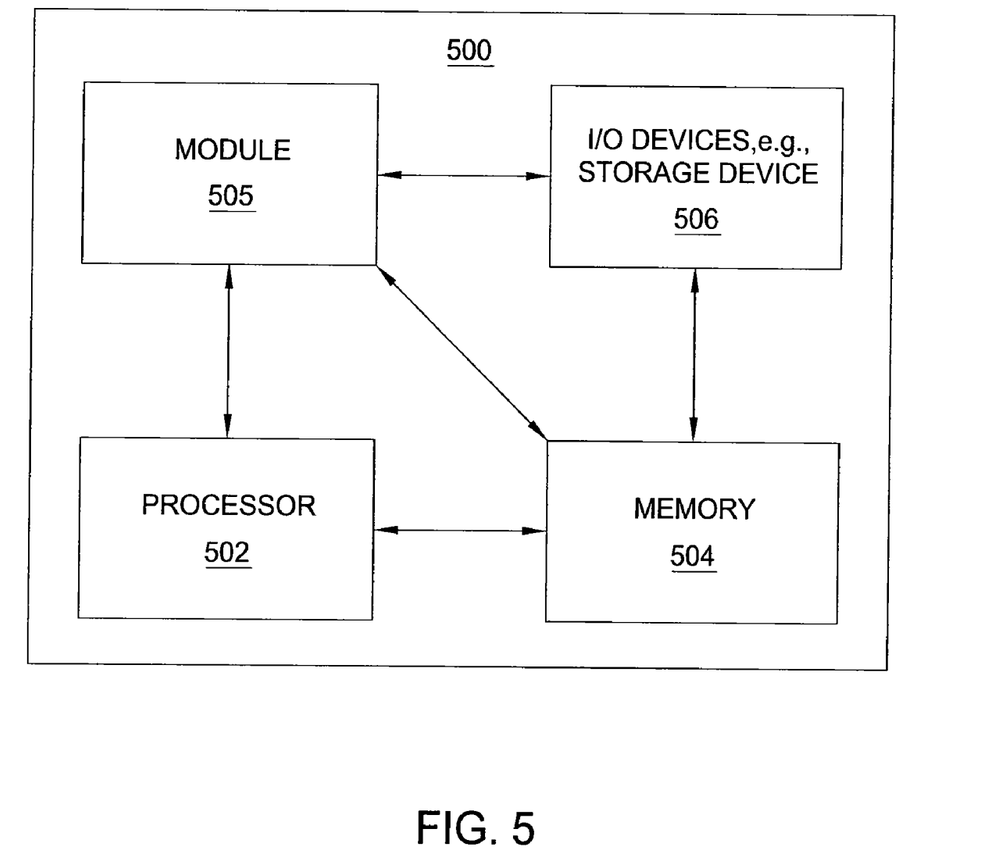
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a measurement of performance for a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a measurement of performance for a network can be loaded into memory 504 and executed by processor 502 to implement the functions as discussed above. As such, the present process 505 for providing a measurement of performance for a network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a measurement of performance for a network, comprising:
   sending a plurality of multi-objective probes on a path;
   receiving at least one of the plurality of multi-objective probes for the path; and
   determining a plurality of performance measurements for at least one parameter of the path from the at least one of the plurality of multi-objective probes, wherein each of the plurality of multi-objective probes comprises at least one marker indicating at least one of the parameters to be measured.

2. The method of claim 1, further comprising:
determining at least one network quantile bound of distribution for at least one of the at least one parameter.

3. The method of claim 2, wherein the at least one network quantile bound is based on an additive network performance model for a network delay.

4. The method of claim 1, wherein the path comprises an end-to-end path.

5. The method of claim 1, wherein the determining the plurality of performance measurements comprises determining at least a delay variation parameter and a packet loss rate parameter.

6. The method of claim 5, wherein the delay variation parameter comprises a time difference between two probes when the two probes are sent, and a time difference between the two probes when the two probes are received.

7. The method of claim 1, wherein the plurality of multi-objective probes comprises a single probing stream.

8. A computer-readable medium having stored thereon a plurality of instructions, the plurality of instructions including instructions which, when executed by a processor, cause the processor to perform a method for providing a measurement of performance for a network, comprising:
sending a plurality of multi-objective probes on a path;
receiving at least one of the plurality of multi-objective probes for the path; and
determining a plurality of performance measurements for at least one parameter of the path from of the at least one of the plurality of multi-objective probes,
wherein each of the plurality of multi-objective probes comprises at least one marker indicating at least one of the parameters to be measured.

9. The computer-readable medium of claim 8, further comprising:
determining at least one network quantile bound of distribution for at least one of the at least one parameter.

10. The computer-readable medium of claim 9, wherein the at least one network quantile bound is based on an additive network performance model for a network delay.

11. The computer-readable medium of claim 8, wherein the path comprises an end-to-end path.

12. The computer-readable medium of claim 8, wherein the determining the plurality of performance measurements comprises determining at least, a delay variation parameter and a packet loss rate parameter.

13. The computer-readable medium of claim 12, wherein the delay variation parameter comprises a time difference between two probes when the two probes are sent, and a time difference between the two probes when the two probes are received.

14. The computer-readable medium of claim 8, wherein the plurality of multi-objective probes comprises a single probing stream.

15. An apparatus for providing a measurement of performance for a network, comprising:
means for sending a plurality of multi-objective probes on a path;
means for receiving at least one of the plurality of multi-objective probes for the path; and
means for determining a plurality of performance measurements for at least one parameter of the path from the at least one of the plurality of multi-objective probes,
wherein each of the plurality of multi-objective probes comprises at least one marker indicating at least one of the parameters to be measured.

16. The apparatus of claim 15, further comprising:
means for determining at least one network quantile bound of distribution for at least one of the at least one parameter.

17. The apparatus of claim 15, wherein the means for determining determines at least a delay parameter and a packet loss rate parameter.

18. The method of claim 1, wherein separate algorithms are simultaneously executed to measure at least two parameters of the path using the at least one of the plurality of multi-objective probes.

19. The computer-readable medium of claim 8, wherein separate algorithms are simultaneously executed to measure at least two parameters of the path using the at least one of the plurality of multi-objective probes.

20. The apparatus of claim 15, wherein separate algorithms are simultaneously executed to measure at least two parameters of the path using the at least one of the plurality of multi-objective probes.

* * * * *

UNITED STATES PATENT AND TRADEMARK OFFICE
CERTIFICATE OF CORRECTION

| | |
|---|---|
| PATENT NO. | : 8,073,945 B2 |
| APPLICATION NO. | : 12/109743 |
| DATED | : December 6, 2011 |
| INVENTOR(S) | : J. Sommers et al. |

It is certified that error appears in the above-identified patent and that said Letters Patent is hereby corrected as shown below:

At column 13, line 34 (claim 8, line 10) of the printed patent, please delete "of" after from.

Signed and Sealed this
Thirteenth Day of March, 2012

David J. Kappos
*Director of the United States Patent and Trademark Office*